United States Patent
Ehrgott

(10) Patent No.: US 10,980,342 B2
(45) Date of Patent: Apr. 20, 2021

(54) TIRE RACK SECURING SYSTEM

(71) Applicant: Glenn Ehrgott, Flanders, NJ (US)

(72) Inventor: Glenn Ehrgott, Flanders, NJ (US)

( * ) Notice: Subject to any disclaimer, the term of this patent is extended or adjusted under 35 U.S.C. 154(b) by 0 days.

(21) Appl. No.: 16/446,189

(22) Filed: Jun. 19, 2019

(65) Prior Publication Data

US 2019/0380491 A1 Dec. 19, 2019

Related U.S. Application Data

(60) Provisional application No. 62/686,790, filed on Jun. 19, 2018.

(51) Int. Cl.
*A47B 81/00* (2006.01)
*B62D 43/00* (2006.01)

(52) U.S. Cl.
CPC .......... *A47B 81/007* (2013.01); *B62D 43/002* (2013.01)

(58) Field of Classification Search
CPC .... A47B 81/007; A47B 96/061; B62D 43/002
USPC .......................................... 211/20, 85.18, 193
See application file for complete search history.

(56) References Cited

U.S. PATENT DOCUMENTS

| | | | | |
|---|---|---|---|---|
| 614,432 A * | 11/1898 | Austin | ..................... | B62H 3/00 211/5 |
| 1,004,597 A * | 10/1911 | Smith | .................. | A47B 96/061 248/241 |
| 1,006,361 A * | 10/1911 | Daly | ..................... | A47B 96/061 248/241 |
| 1,438,729 A | 12/1922 | Vance | | |
| 1,854,711 A * | 4/1932 | Mayer | ..................... | B60P 3/055 410/68 |
| 2,377,149 A * | 5/1945 | Heil | ..................... | B62D 43/002 414/463 |
| 2,626,714 A * | 1/1953 | Rover | ..................... | A47G 25/08 211/100 |
| 3,025,122 A * | 3/1962 | Millman | ............... | A47B 95/008 312/245 |
| 3,181,704 A * | 5/1965 | Thomas | ................... | B65D 7/14 211/74 |
| 3,184,068 A * | 5/1965 | Wende | ..................... | A47F 7/04 211/23 |
| 3,396,840 A * | 8/1968 | Farren | .................. | A47B 81/007 312/9.56 |
| 3,557,966 A * | 1/1971 | Skubic | ................. | A47B 81/007 211/24 |
| 3,602,368 A * | 8/1971 | Gould | .................... | F17C 13/084 206/598 |
| 3,677,562 A * | 7/1972 | Bronstein | ................. | B60P 7/15 410/97 |

(Continued)

FOREIGN PATENT DOCUMENTS

| | | | | |
|---|---|---|---|---|
| CA | 2573846 A1 * | 7/2007 | ........... | A47B 81/007 |
| WO | WO-03016790 A1 * | 2/2003 | ........... | A47B 96/061 |

*Primary Examiner* — Stanton L Krycinski
(74) *Attorney, Agent, or Firm* — Baldini Law, LLC; Jack Baldini, Esq.

(57) ABSTRACT

This disclosure relates to the use of modified and specifically adapted e-track storage components to facilitate the security and stabilizing of tires in an existing mounted tire rack. The tire rack could be one mounted on a wall within a storage facility or garage or one mounted in a mobile environment such as the interior or exterior of a trailer.

4 Claims, 8 Drawing Sheets

(56) References Cited

U.S. PATENT DOCUMENTS

| | | | | |
|---|---|---|---|---|
| 3,765,635 A * | 10/1973 | Burrell | F17C 13/084 | 248/313 |
| 3,863,799 A * | 2/1975 | Thomaswick | B65D 21/08 | 220/1.5 |
| 3,976,200 A * | 8/1976 | Munns | B62H 3/12 | 211/18 |
| 4,884,729 A * | 12/1989 | Barkouskie | B62D 43/002 | 224/42.21 |
| 4,899,895 A * | 2/1990 | Espasandin | F17C 13/084 | 211/181.1 |
| 5,069,408 A * | 12/1991 | Bessinger | A47B 96/061 | 108/108 |
| 5,154,310 A * | 10/1992 | Massey | B65D 19/44 | 108/53.3 |
| 5,154,556 A * | 10/1992 | Wappel | F17C 13/084 | 211/85.18 |
| 5,190,260 A * | 3/1993 | Daubenspeck | F24H 9/06 | 248/146 |
| 5,393,024 A * | 2/1995 | Daubenspeck | F24H 9/06 | 248/146 |
| 5,487,518 A * | 1/1996 | McCraney | F24H 9/06 | 248/225.11 |
| 5,573,360 A * | 11/1996 | Bennett | B60P 7/08 | 410/36 |
| 5,752,791 A | 5/1998 | Ehrlich | | |
| 5,807,047 A * | 9/1998 | Cox | B60P 7/15 | 410/143 |
| 5,857,577 A * | 1/1999 | Thomas | A47B 57/26 | 211/94.01 |
| 5,897,086 A * | 4/1999 | Condon | F24H 9/06 | 248/154 |
| 6,095,472 A * | 8/2000 | Hubbard | F24H 9/06 | 248/225.11 |
| 6,138,864 A * | 10/2000 | Enochs | B25H 3/00 | 206/373 |
| 6,254,052 B1 * | 7/2001 | Hubbard | F24H 9/06 | 248/225.11 |
| 6,364,141 B1 * | 4/2002 | Ehrgott | A47F 5/0823 | 211/103 |
| 6,390,309 B1 * | 5/2002 | Tucker | B63B 32/80 | 211/85.7 |
| 6,672,546 B2 * | 1/2004 | Calleja | A47F 5/01 | 248/58 |
| 7,025,548 B2 * | 4/2006 | Krawczyk | B60P 3/055 | 410/66 |
| 7,172,204 B1 * | 2/2007 | Tierney | A47B 81/00 | 280/79.11 |
| 7,413,091 B2 | 8/2008 | Krull | | |
| 7,628,281 B2 * | 12/2009 | Sopel | B60P 7/15 | 211/7 |
| 8,276,864 B2 * | 10/2012 | Ye | F16M 11/04 | 248/287.1 |
| 9,179,789 B1 * | 11/2015 | Fitzgerald | A47F 7/00 | |
| 9,605,798 B2 * | 3/2017 | Brown | F16M 13/02 | |
| 9,635,940 B2 * | 5/2017 | Letham | A47B 81/00 | |
| 10,092,098 B2 * | 10/2018 | Jackson | A47B 81/00 | |
| 2002/0117464 A1 * | 8/2002 | Ehrgott | B61D 45/001 | 211/189 |
| 2003/0029977 A1 * | 2/2003 | Kim | A47B 81/007 | 248/230.8 |
| 2003/0178382 A1 * | 9/2003 | Tucker | A47B 81/00 | 211/85.7 |
| 2004/0238465 A1 * | 12/2004 | Mercure | A47F 7/0042 | 211/41.14 |
| 2009/0084739 A1 * | 4/2009 | Shock | A47B 81/007 | 211/4 |
| 2012/0027558 A1 * | 2/2012 | Weeden | A47B 81/007 | 414/800 |
| 2015/0272348 A1 * | 10/2015 | Drake | A47B 57/34 | 211/193 |
| 2016/0135594 A1 * | 5/2016 | Anderson | A47B 81/00 | 211/85.7 |

* cited by examiner

TIRE RACK SECURING SYSTEM

This Application claims priority to Provisional Application Ser. No. 62/686,790 filed on Jun. 19, 2018, which is incorporated herein as if fully set forth.

FIELD OF THE INVENTION

This disclosure relates to the use of modified and specifically adapted e-track storage components to facilitate the security and stabilizing of tires in an existing mounted tire rack. The tire rack could be one mounted on a wall within a storage facility or garage or one mounted in a mobile environment such as the exterior or interior of a trailer and could be implemented with other restraining devices.

BACKGROUND

Transport and storage of tires is cumbersome and if not done properly, can be dangerous. Tires are heavy and bulky. Tires have previously been stored by simply placing them on the ground in stacks, generally parallel to the floor surface on which they rest. It has been suggested that various rack arrangements may be utilized to store tires above a floor surface or other support surface. For example, various rack systems are disclosed in U.S. Pat. Nos. 1,438,729; 7,413,091; and in U.S. Patent Publication No. US 2012/0027558 A1. In all of these configurations, the tires sit generally upright, next to each other, on two parallel bars spaced appropriately to allow the outer surface of the circumference of a tire to rest in the space between the bars.

The tires in this configuration generally support each other, the side of one tire resting generally on the side of another tire, and so on until the side of one tire rests against the side of one edge of the rack. This is fine in a garage or a location where the tires are unlikely to move or be jostled until someone goes to take a tire from the rack. However, in situations where tires may be subject to movement, especially in situations of transport, it is desirable to have the tire secured in some manner other than just sitting in its rack location and supported by the tire next to it or the rack edge.

Differences in need may occur where there is a need to simply secure one tire, two tires, or ten tires, or less than the number of tires to fill the rack. Even in a full rack situation, a sudden stop could cause multiple tires to jump out of the rack and fall.

Industry has attempted to address the restraint of tires in a rack. For example, see FIG. 2 (prior art) for an example of prior art where tires sitting in a rack are secured from jumping or jostling out of the rack by inserting a bar through the middle of the tires and securing the bar to either end of the tire rack. An example of this in the marketplace is available at www.pitproducts.com/collections/tire-racks-and-tire-storage, and the device as shown in FIG. 2 (prior art), that illustrate a basic tire rack mountable to a wall surface that also contains a center bar mounted to each edge of the tire rack and designed to insert through the middle of the tires preventing the tires so mounted to be able to jump out or otherwise fall out of the rack unless and until the bar is first removed.

While effective and safe, there are several disadvantages to this configuration. Firstly, anytime a tire is desired to be placed on the rack or removed from the rack, the center bar must first be dislodged and removed and once the tire is either placed on the rack or removed as desired, the bar then replaced. This can be a cumbersome task.

Additionally, if the tires are not mounted on rims, the space in the center of the tire is large and although the tire could not jump out of the rack altogether, it could move significantly within the rack. Alternatively, if the tire is mounted on a rim, and the securing bar is mounted through the axel hole of the rim, the securing bar could cause wear and tear on the rim axel mount.

It is thus an object of the present disclosure to address these shortcomings and provide a securitization and restraint system for tires or other cargo mounted in a wall mounted rack that is both effective and safe to secure the tires or cargo, yet simple and efficient to use and reuse.

E-track is well known in the industry as a flexible and convenient accessory to storage systems. For example, wall-based and free-standing storage units are well known in the art. Such units are either individually secured to a wall or cooperate with a dedicated rail, slot, or channel or are used with a pegboard or slat wall arrangement. (See U.S. Pat. Nos. 4,318,486; 4,723,663; 4,982,922; 4,867,623; 4,852,747; 5,224,609; 5,265,992; 5,322,256; 5,740,927; 5,807,047 and; 5,839,589). Such arrangement may utilize horizontal bars or rails on which brackets or hooks are mounted in order to support various items. Storage units have been described having hooks permanently attached to specified points on a bar. Other storage systems describe sliding brackets captured on a rail. Additionally, other storage systems provide a changeable, slidable bracket utilizing an open-ended fastener at the back of the bracket which is slipped over the top of the rail. See, U.S. Pat. No. 3,260,489. Further systems employ brackets with fasteners which are trapped on a rail (See, U.S. Pat. Nos. 2,291,966 and 2,546,720). Further still, storage systems have been described which provide wall systems which are readily adjustable to differently shaped loads capable of supporting heavy loads. (See, U.S. Pat. No. 4,318,486). Such systems provide a mounting rail carrying brackets with U-shaped fastener sections which grip the rail but which can be slipped off at one or more grooves in the rail. The wall based systems described herein above limit the type of devices that can be stored. The slidable variety of the systems limit the number of brackets or limit the changing of brackets after the rail or equivalent has been mounted. Importantly, in a mobile environment, brackets could slide in alignment with an open groove and become dislodged or cause stored materials to collide with one another. Other disclosures have provided storage systems and fittings to be employed with a track member wherein the fitting has a positive pivotal retainer means that may be easily operated for locking and unlocking the fitting relative to the track. Such systems provide a secure fitting of cargo for transportation.

Anchor fittings have also been described. Such fittings provide for removably attaching objects to the floor or wall of a vehicle. Such fittings may be operate in conjunction with a track attached to a vehicle floor with the track having alternate notch and neck proportions which matingly engage the fittings. (See, U.S. Pat. Nos. 2,6888,504; 4,033,268; 4,230,432; 4,256,424; 4,708,549; and 5,265,992). Such devices limit use to either a beam supported at both ends, a strap, or an anchor ring type device or opening which cooperates with common cargo control device such as a ratchet strap or load binder.

The prior art also describes fittings, which has a positive pivotal retainer means that may be easily operated for locking and unlocking the fitting relative to openings provided in conjunction with cargo control track. Such fittings provide for removably attaching objects to the floor or wall of a vehicle. Such fittings operate in conjunction with openings provided in cargo control track attached to the floor, walls or ceiling of a vehicle, or other rigid support structure, such as a building, fence, or shed. The prior art devices limit use to either a beam supported at both ends, with insertion member ends attached pivotally, and directly to an insertion member, or attachment of the secondary device is through sewn in non rigid, fabric or woven material. The prior art describes devices limited to either a beam supported at both ends, a strap, or an anchor ring type device or opening which cooperates with a common cargo control device such as a ratchet strap, or load binder. The direct support of objects to be stored, and resulting cantilever, or tension loads are described in U.S. patent Ser. No. 09/303,530.

Known e-track devices for securing a tire are generally directly related to providing a hook, a shelf, a securing device to directly store an item. For example, there are e-track tire carrier mounts and spare tire holders that secure a tire to an e-track mounted bracket.

This disclosure capitalizes on and advances the prior art by teaching combining the utility of e-track mounted accessories and existing tire rack wall mount devices to provide a simple and ingenious device and system to secure stored tires, whether mounted on or unmounted on rims, without any potential of tire or rim wear, and without having to undo and refasten a middle security bar each and every time one tire is desired to be placed or removed.

Here, in one embodiment, the disclosure teaches utilizing an e-track installation strategically placed and mounted in combination with existing wall mounted tire racks and further providing a plurality of proprietary and custom fitted e-track attachable arms that extend perpendicularly outward from the e-track bar to a distance pre-configured to extend just beyond the outer edge of the circumference of a tire or tires placed into the tire rack and said arms further configured to have bumpers (a surface material that protects the sidewalls of secured tires) placed to meet with the sidewalls of an exterior edge tire as well as a means for securing one such arm with a corresponding arm placed so that the two arms form an interior within which are placed the tires. In one embodiment, this is substantially as shown in FIGS. 3, 4 and 6.

This has several advantages over the prior art. Firstly, there is no bar that runs through the center of a group of tires that has to be removed to manipulate the tires. In an embodiment where the arms are not secured, one to the other, it is as if they aren't there at all and the tires can be placed and removed at will as if there were no securing or restraint system. In an embodiment where the arms are secured one to the other, the tires are restrained from jumping or otherwise jostling out of the rack just as securely as if there were a center bar restraint. However, in one embodiment, securing one bar to the other may be as simple as using a tie strap with a hook on either end wherein said hook can fit through a strategically placed hole at the end of each arm set and said tie strap can be tightened and loosened at will. The rubber bumpers (contacting tire surface material) prevent the arms from chafing against any part of the tires and it is no different than the sidewall of one tire touching the sidewall of an adjacent tire. Moreover, since the arms are e-track mounted, they can easily be positioned and repositioned within the e-track bar to create an interior width between the arm sets of any desired width to accommodate any number of tires, and tires of various dimensions.

None of the disclosed prior art references or other known prior art, alone or in combination, teach the salient and proprietary features of the present disclosure as just described.

SUMMARY

The present disclosure teaches embodiments of an e-track accessory that comprise an arm of a pre-determined length comprising an e-track attachment at one terminus, a means such as a hole for a hook (although other means are herein described) disposed near the opposite terminus, and bumpers (a surface treatment that prevents tire sidewall damage) disposed on the side of the arm that will be adjacent to tires. By utilizing a wall mount tire rack and a length of e-track placed along the wall where such tire rack is mounted and a pair of arms as just described that form a mirror set (one arm with bumpers mounted on first side and a second identical arm except that the bumpers are mounted on the opposite side), such that when both arms are mounted into the e-track, an interior width between the arms is formed within which a predetermined number of tires may be secured by using a means to tighten the two corresponding arms towards each other when tires are placed in the tire rack.

DETAILED DESCRIPTION

For clarity of disclosure, and not by way of limitation, the detailed description of the invention is divided into the following subsections that describe or illustrate certain features, embodiments or applications of the present invention.

Definitions

"accessory tension arm" as used herein means an e-track accessory that is substantially a bar configured to secure to e-track at a first end and comprise a means to secure said arm to either a second arm when both are mounted to an e-track bar, or some other securement point such as, but not limited to, a rack mounted O-ring.

"e-track bar" as used herein means the industry standard strip with spaced slots such that when mounted, specially made e-track accessories can clip and unclip into the slots.

"mounting bar" as used herein means any industry standard strip configured to accept corresponding attachment accessories and includes but is not limited to a-track, e-track, f-track, L-track, airline track and/or other standard cargo securing track technology.

"bumpers" as used herein means a specialized material used to soften the contact between two objects and prevent chafing and wear, and especially designed for mounting on an accessory tension arm or a tire storage rack to prevent chafing of stored tires.

The System and Method of the Present Invention

In one embodiment, accessory tension arms (8) are used in pairs and are substantially identical except for the positioning of the bumpers (13) which are opposite.

Figure 4:
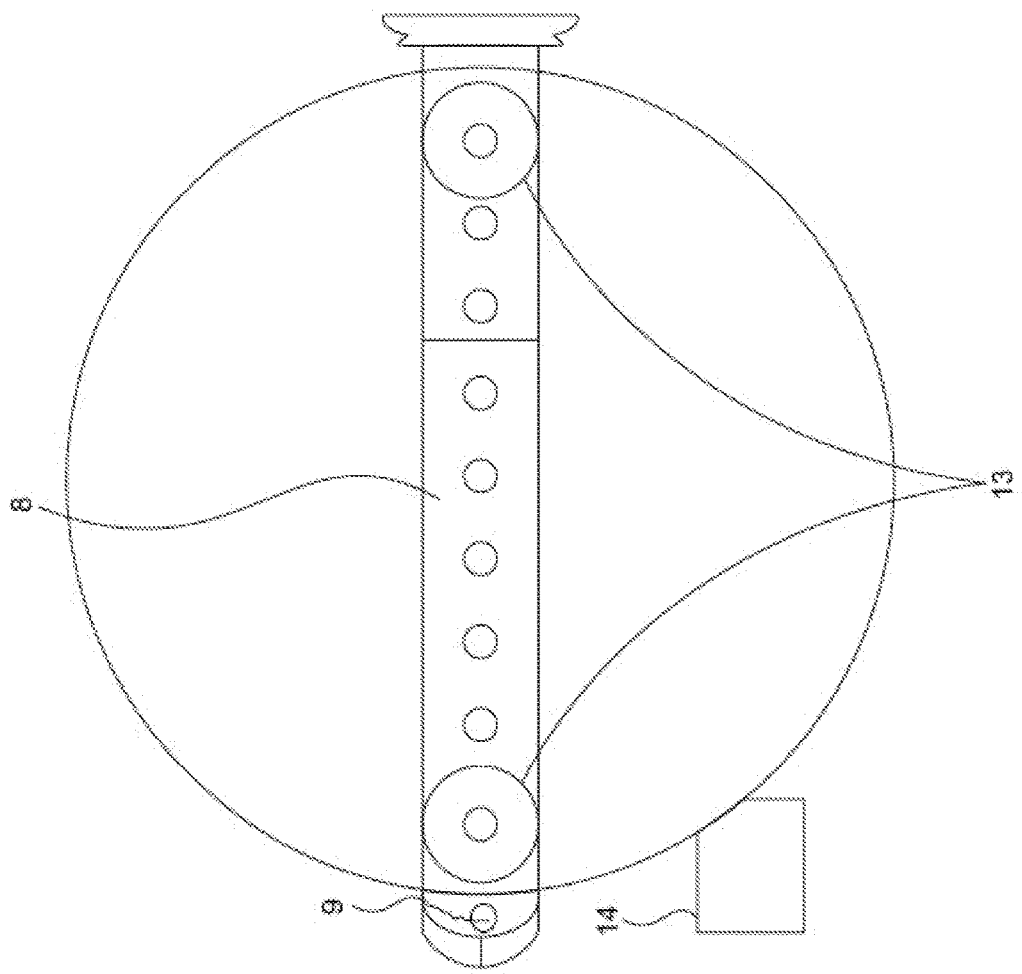
FIG. 4 depicts one embodiment of an e-track accessory tension arm (8) depicting where bumpers (13) would be located to contact tires to be secured and showing its configured hole (9) that extends past the outer edge of a tire to be secured that can be utilized as a means to provide tension. Additionally, a contact support point (14) along the bottom frame member of the tire rack is shown. In this embodiment, there are two tire tread contact points, one at the bottom frame member, and one at the e-track mounting bar. Additionally, there are two tire sidewall contact points, one at each bumper.
Figure 5:
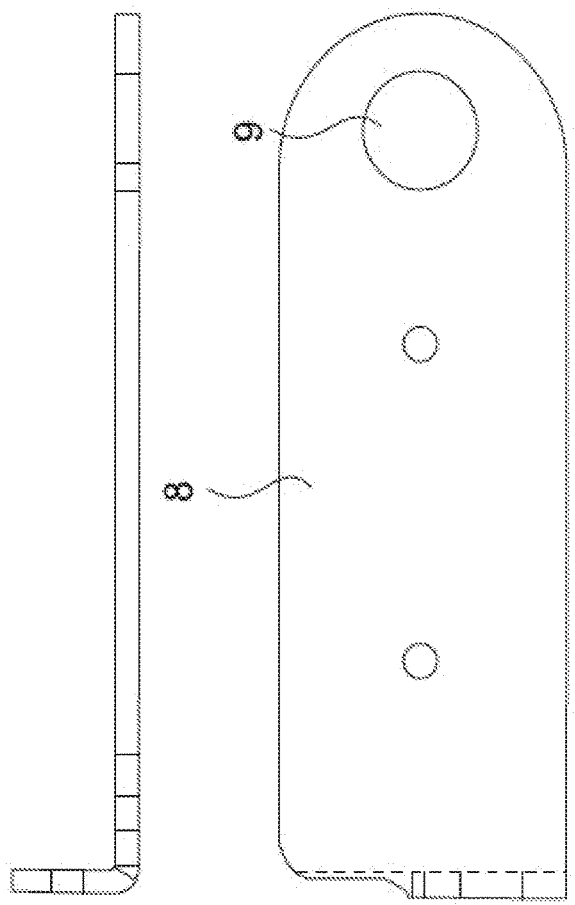
FIG. 5 depicts one embodiment of an e-track accessory tension arm (8) and preferred dimensions of its various components as described herein, including the outer configured hole (9). In one embodiment, the tension arm (8) is 1.875 inches high with holes along its length spaced at 2 inches. Bumpers could be attachable to (and detachable from) any hole.

In one embodiment, accessory tension arms (8) are substantially the length of the diameter of a tire to be secured plus an extra inch or two (as shown in FIG. 4).

In one embodiment, accessory tension arms may be fashioned from a material chosen from the following group: metal, metal alloy, aluminum, plastic, synthetic material, polycarbonate, plexiglass. One skilled in the art may choose any suitable material based on expected design characteristics, such as overall weight, durability, strength, and the like.

Figure 6:
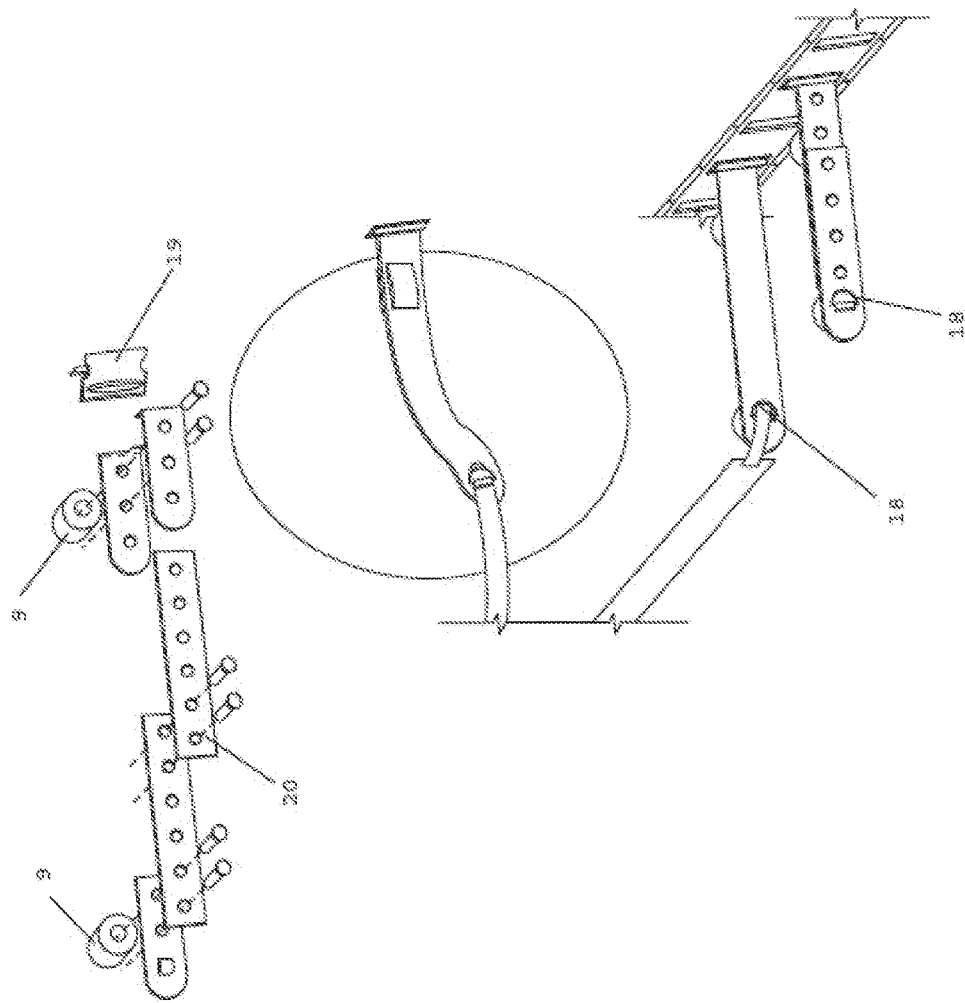
FIG. 6 depicts various embodiments of elements of an e-track accessory tire storage rack depicting attachment of bumpers (13), O-ring tie-offs (18) and e-track attachment clips (19). Moreover, in one embodiment, e-track accessory tension arms could be modular and extendable in length or telescopic through the use of spaced holes and attachment means (20).
Figure 7:
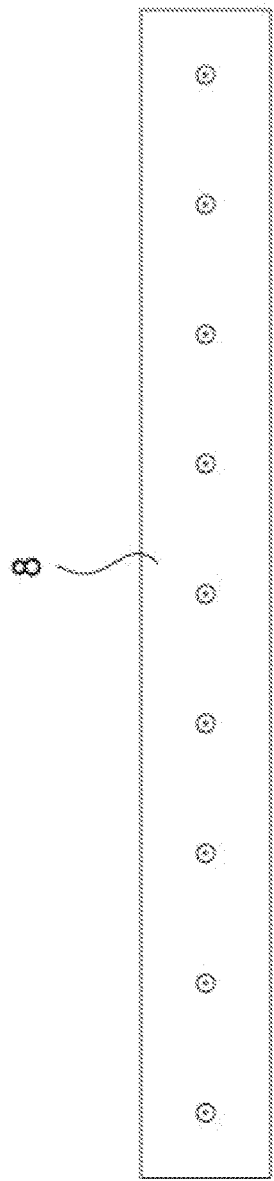
FIG. 7 depicts one embodiment of an e-track accessory tension arm (8) and preferred dimensions of spaced holes for attachments wherein the arm is 3/16 inches thick, 18 inches long, 2 inches wide, with holes spaced every 2 inches in the middle of its height.
Figure 8:
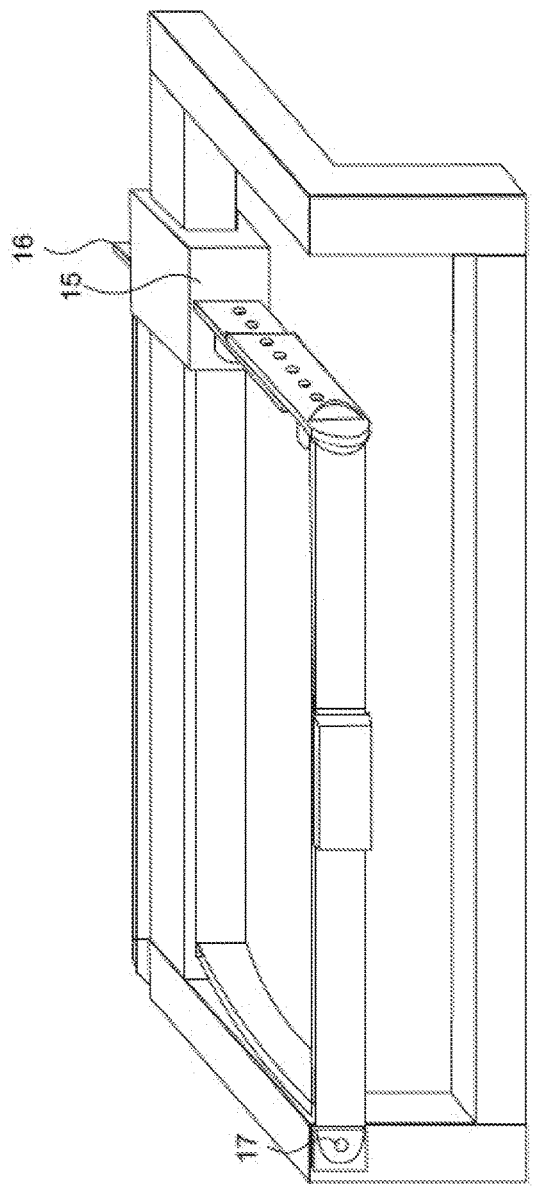
FIG. 8 depicts one embodiment of an e-track accessory tire storage rack with one embodiment of tensioning components, including a sliding non-articulating member (15), ratchet strap guides (16) and securement points (17).

In one embodiment, accessory tension arms (8) may be telescopic or modular and extendable in length through the use of spaced holes and attachment means (20) as shown in FIG. 6, to provide flexibility in the length of the arm and allow them to be used with different sized tire racks and tires.

In one embodiment, the bumpers (9) are spaced so that they meet with the outside edge of the tire wall on either side as shown on FIG. 4.

In one embodiment, the bumpers are attached with nut and bolt. In one embodiment, the bumpers are attached with glue. In one embodiment, the bumpers are attached with a hook and loop fastener so that they are locatable as desired along the inside surface of the arm.

In one embodiment, the bumpers are made from rubber. In an alternative embodiment, the bumpers can be made from any cushioning material.

In one embodiment, the ends of the accessory tension arms opposite the ends that attach into the e-track with the e-track attachment mechanism have a small hole bored through (9) which provides a means to connect the ends of a pair of facing arms via a tie-down strap with hooks at either end. In this configuration, the hook at one end of a tie-down strap is inserted into the hole of one of the arms and the hook at the opposite end of the tie-down strap is inserted into the hole of the facing arm. Then, the tie-down strap is tightened until the bumpers on the inside of the arms meet the outer surface of the tire walls and a minimal tension is placed on the tie-down strap. Shown on FIG. 3, is a configuration where the tension is provided by the use of one accessory tension arm (8), a hole bore through (9), a ratchet strap (11) secured to an attachment point (10) mounted on a bar of the tire rack itself.

In an alternative embodiment, a bungee cord could be used to affix two facing arms towards each other and secure a set of tires between them.

In an alternative embodiment, a specialized bar could be utilized wherein on one end, it is affixed to the end of one arm with a hinge and when ready, it swings closed like a door and closes with a latch to secure it at its other end to the facing arm. In this embodiment, the specialized bar could be telescopic to provide for various lengths.

Figure 1:
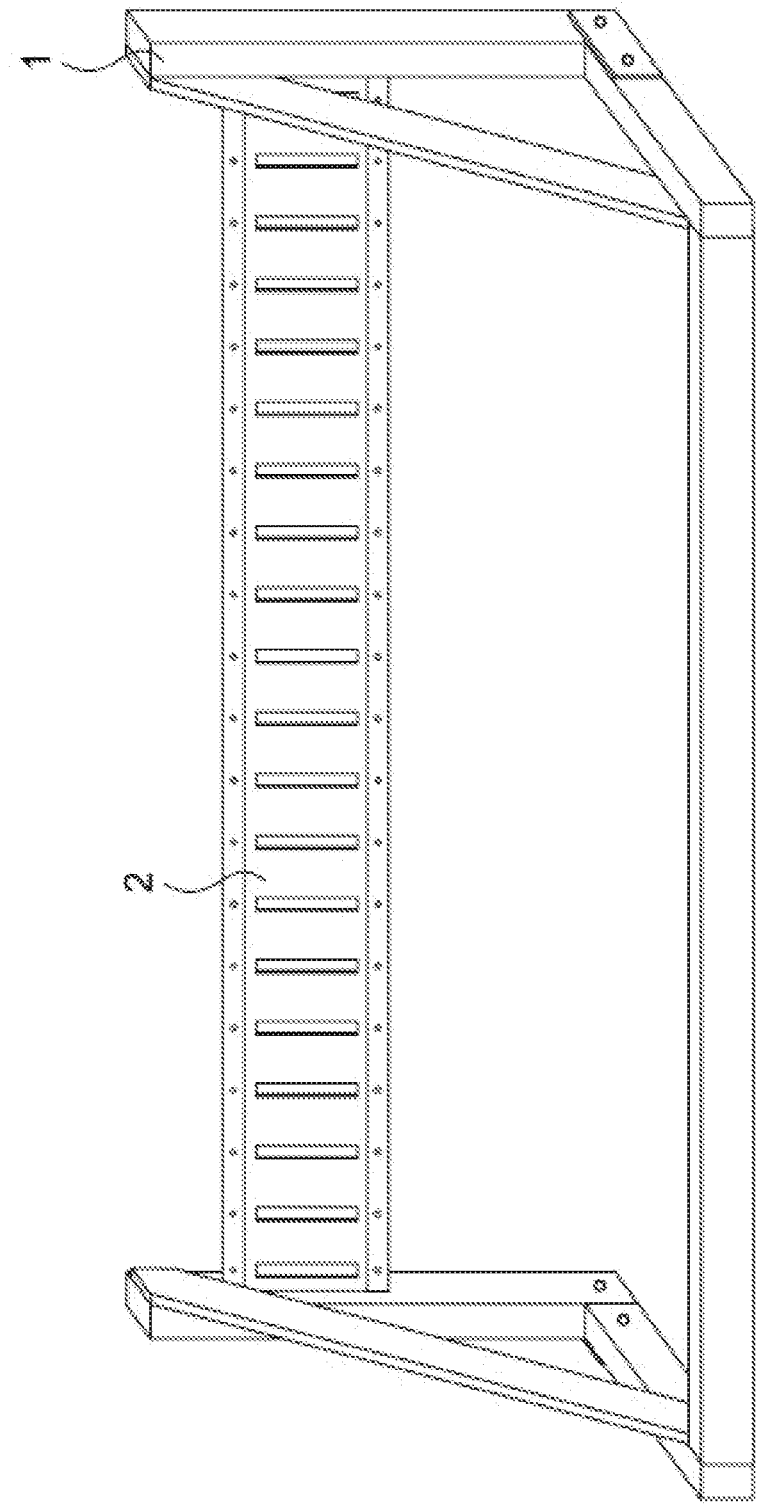
FIG. 1 depicts one embodiment of an e-track accessory tire storage rack (1) showing such device mounted to an, or containing a separately configured, e-track bar (2).
Figure 2:
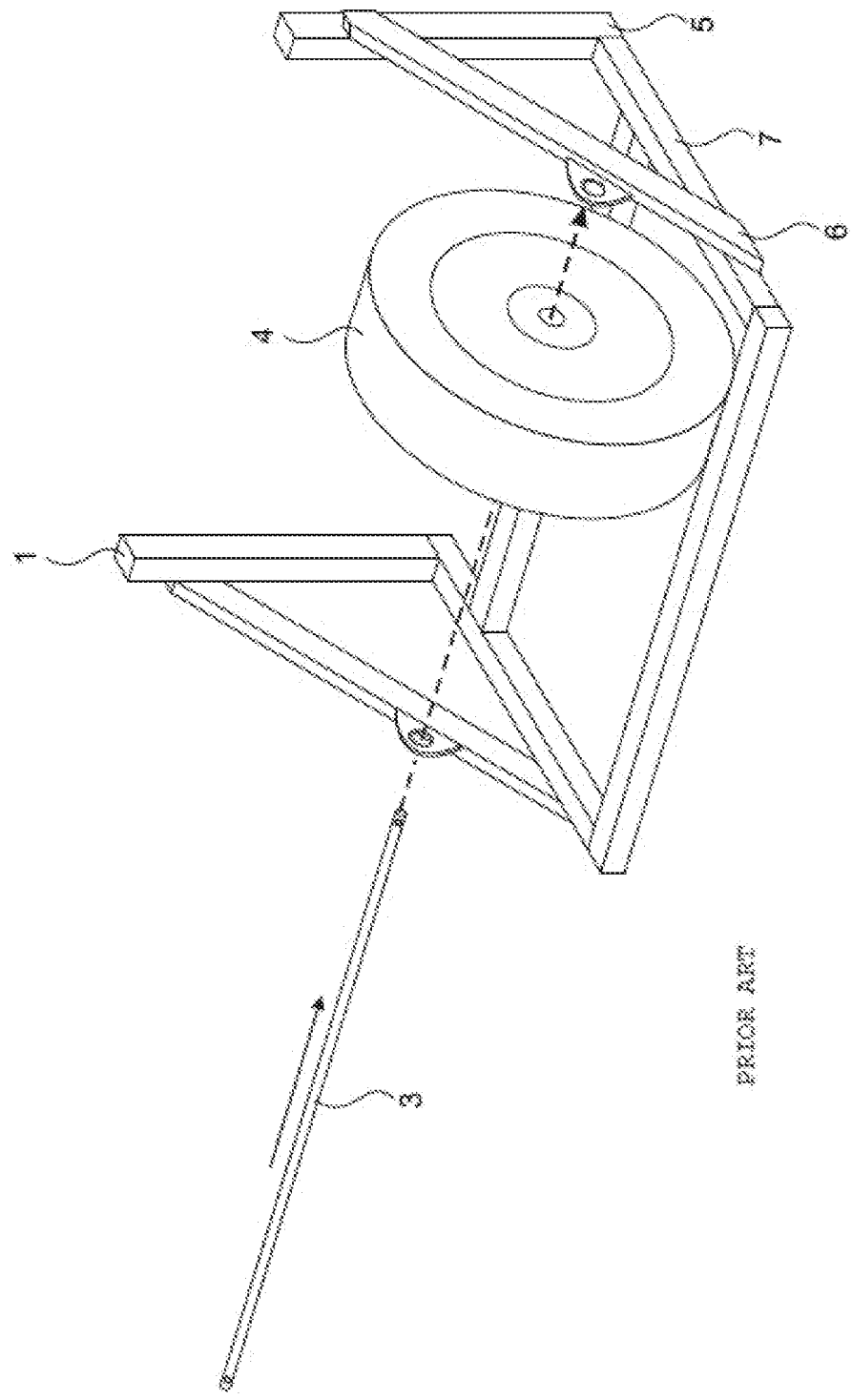
FIG. 2 depicts an embodiment of a prior art tire storage rack (1) showing how a central through bar (3) typically inserts through the center of a tire (4) to be secured. A tire rack as shown may also have hinges at location(s) (5) to facilitate a fold-up or down of rack to get out of way when not in use. Additionally, tension members at location(s) (6) may be one-pieced or hinged to assist in folding, typically, outside of lower horizontal member (7) (which means a tire on the rack would contact the lower member).
Figure 3:
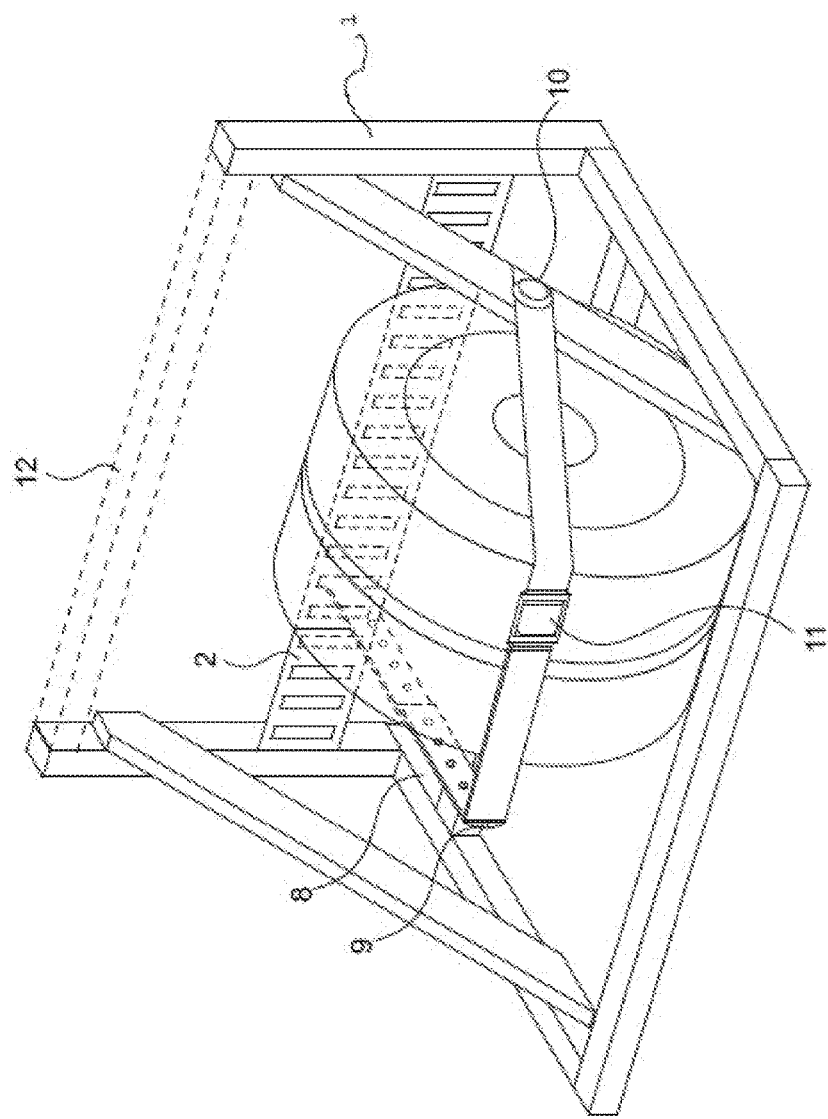
FIG. 3 depicts one embodiment of an e-track accessory tire storage rack (1), which may optionally contain all of the prior art configurations as demonstrated in FIG. 2, except that there is no need for a central through bar because in this embodiment, there is an e-track accessory tension arm (8) secured to an e-track bar (2) at a first end, and a second opposite end of the arm further configured with a hole (9) that extends past the outer edge of a tire to be secured that can be utilized as a means to secure to any of another such arm or an attachment point (10) mounted on a bar of the tire rack itself via a ratchet strap (11) to apply tension and secure tires within the rack. An optional top frame cross bar (12) is shown.

In an alternative embodiment, according to FIG. 3, only one accessory tension arm (8) is utilized with support provided by a horizontal or perpendicular side support member of the accessory tire storage rack (1). A securement point (10) is located at a spot along a support member such that when the accessory tension arm (8) is set into place on the e-track (2), a tension providing means, such as a tie-down strap or bungee cord (11) is affixed at one end on the configured hole (9) of an end of the accessory tension arm (8), and at the other end to the securement point (10), which may be a hole or an attached O-ring or other securement means.

EXAMPLES

The present invention is further illustrated, but not limited by, the following examples.

In one embodiment, in a typical installation, an existing tire rack is mounted to a wall or the inside of a trailer. An e-track bar is then installed at approximately the mid-point of the height if the tire rack, or otherwise in line with where the centerline of the tire would line up when the tires are placed in the tire rack. Once installed, tires are then placed in the tire rack. To secure the tires, a pair of accessory tension arms as described herein are mounted in the e-track, a first arm at a first end of the tire rack with its bumpers facing toward the tires. After a number of tires are then placed in the tire rack, the second of the pair of arms, with its bumpers facing opposite, i.e., also facing inward toward the tires, is mounted into the e-track just outside the outer edge of the last tire.

In an alternative embodiment, only one accessory tension arm is required.

In an alternative embodiment, the tire storage rack itself, as modified with an e-track bar as described, is configured to have the entire rack attach to an e-track mounting bar so that it does not have to be permanently attached.

In one embodiment, once a pair of accessory tension arms are in place, they are then secured to each other with a mechanism such as a tie-down strap or bungee cord to pull each arm, one towards the other putting a minimal pressure of the bumpers against the outer walls of the end tires. Alternatively, in an embodiment where only one accessory tension arm is used, the tension is created with a securement point on the tire rack.

In both of these embodiments, when another tire is desired to be placed into the tire rack, or one of the placed tires is desired to be removed, it is as simple as loosening the tie-down strap or removing the bungee cord. Then, in the case of removing a tire, remove it just as if there were no retraining device in place. To then restrain the rest of the remaining tires, simply replace the one outer accessory tension arm from the spot on the e-track where it was to a closer spot near to last of the remaining tires and then re-affix the tie-down strap or bungee cord. On the other hand, if a tire is needed to be added to the rack, it is as simple as loosening the tie-down strap or removing the bungee cord. Then, remove the one accessory tension arm, place the tire, and then replace the one removed outer arm to a spot near to the end of the newly added tire and then re-affix the tie-down strap or bungee cord.

In one embodiment, more than a pair of accessory tension arms may be utilized. For example, a third arm may be utilized to add an extra tire with both the second and third arms then getting secured to the first arm.

In one embodiment, any surface of either any accessory tension arm or members of the tire rack that will or may contact with a tire, is coated with a protective surface treatment.

In one embodiment, there is no need for the tire rack to have a second horizontal bottom member to support tires, with proper tensioning, a tire will rest at a point along the outer support member and at the opposite end along the e-track mounting bar.

In one embodiment, the tire rack could be supported by legs and not mounted to a side wall of a truck or elsewhere, but be free-standing and still utilize the tension creating accessory tension arms as described herein.

Publications cited throughout this document are hereby incorporated by reference in their entirety. Although the various aspects of the invention have been illustrated above by reference to examples and preferred embodiments, it will be appreciated that the scope of the invention is defined not by the foregoing description but by the following claims properly construed under principles of patent law.

Each and every feature described herein, and each and every combination of two or more of such features, is included within the scope of the present invention provided that the features included in such a combination are not mutually exclusive.

What is claimed is:

1. A pair of accessory tension arms comprising:
    a first accessory tension arm, being substantially a straight bar comprising a first end with an affixed mechanism to attach the first accessory tension arm at said first end directly to an e-track bar said first accessory tension arm having inherent movement when so attached, and a second opposite end having a means to secure said first accessory tension arm to a second opposite facing accessory tension arm, also being substantially a straight bar; and
    said second opposite facing accessory tension arm comprising a first end with an affixed mechanism to attach said second opposite facing accessory tension arm at said first end of said second opposite facing accessory tension arm directly to said e-track bar said second opposite facing accessory tension arm having inherent movement when so attached, and a second opposite end having a means to secure said second opposite facing accessory tension arm to said first accessory tension arm; and
    both said accessory tension arms further comprising two bumpers mounted on their inner facing surfaces, one substantially near each first end, and the other substantially near said second opposite end.

2. The pair of accessory tension arms of claim 1, wherein said pair of accessory tension arms are made from a material chosen from the group of: metal, metal alloy, aluminum, plastic, synthetic material, polycarbonate, and plexiglass.

3. The pair of accessory tension arms of claim 1, wherein the means to secure said arms to each other is through providing a hole at each respective second opposite end configured to allow a ratchet strap or other tension providing means to secure to said accessory tension arms.

4. The pair of accessory tension arms of claim 1, wherein the affixed mechanism on the first accessory tension arm is a means to attach the accessory tension arm to any mounting bar and the affixed mechanism on the second opposite facing accessory tension arm is a similar means to attach to the same style of mounting bar as said first accessory tension arm.

* * * * *